(12) United States Patent
Fee et al.

(10) Patent No.: US 7,562,861 B2
(45) Date of Patent: Jul. 21, 2009

(54) SYSTEMS AND METHODS FOR CONTROLLING DUCT PRESSURIZATION FOR CABLE INSTALLATION

(75) Inventors: John A. Fee, Garland, TX (US); Frank A. McKiel, Jr., Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

(21) Appl. No.: 11/096,289

(22) Filed: Apr. 1, 2005

(65) Prior Publication Data

US 2006/0219992 A1    Oct. 5, 2006

(51) Int. Cl.
    *E21C 29/16*    (2006.01)
(52) U.S. Cl. .............................. 254/134.4; 254/134.3 R
(58) Field of Classification Search ............. 254/134.4, 254/134.3 FT, 134.3 R
    See application file for complete search history.

(56) References Cited

U.S. PATENT DOCUMENTS

| | | | | |
|---|---|---|---|---|
| 3,987,537 | A | * | 10/1976 | Warren .................... 29/592.1 |
| 4,185,809 | A | * | 1/1980 | Jonnes ..................... 254/134.4 |
| 6,059,264 | A | * | 5/2000 | Kaminski et al. ......... 254/134.4 |
| 6,631,884 | B2 | * | 10/2003 | Griffioen et al. ........ 254/134.3 R |
| 2006/0219992 | A1 | * | 10/2006 | Fee et al. .................. 254/134.4 |

\* cited by examiner

*Primary Examiner*—Lee D Wilson

(57) ABSTRACT

A system includes a duct, a pressurized fluid source, and a valve. The duct receives one or more cables and the pressurized fluid source couples to a first end of the duct and produces fluid pressure within the duct. The valve couples to a second end of the duct and is closed for a time to build pressure within the duct, and then opened to permit the fluid under pressure within the duct to escape rapidly from the duct and propel the one or more cables through the duct.

17 Claims, 10 Drawing Sheets

SYSTEMS AND METHODS FOR CONTROLLING DUCT PRESSURIZATION FOR CABLE INSTALLATION

FIELD OF THE INVENTION

The present invention relates generally to utility cable placement techniques and, more particularly, to utility cable placement within ducts using fluid pressurization.

BACKGROUND OF THE INVENTION

In the field of utility cable installation, there are existing techniques for using the viscous flow of a fluid, such as air, through ducts to install utility cables within the ducts. Such cable "blowing" techniques have been applied to the installation of utility cables in building risers, over relatively short distances along the ground, or in suspended cables.

Existing cable blowing techniques, however, are difficult to apply over distances spanning more than a few kilometers. The flow of a fluid through an extremely long and narrow duct becomes greatly impeded due primarily to viscous flow characteristics, resulting in a high back-pressure experienced at the originating end of the duct. This problem can limit the distances over which existing cable blowing techniques are applied, and can impose constraints on the types of ducts that can be used, as well as the types of cables that may be deployed within a given duct. Additionally, existing cable blowing techniques require that relatively high pressures be applied to the end of a duct through which a cable is being fed. These high pressures can result in duct "blow-outs," where the high pressure causes ruptures in the walls of the duct, or sealing/clamping failures, where the seal between the duct and the unit applying pressurized fluid to the duct ruptures or fails.

SUMMARY OF THE INVENTION

In accordance with an aspect consistent with the principles of the present invention, a method for propelling a cable through a duct may include closing a valve that controls the flow of a pressurized fluid from a first end of the duct, at a second end of the duct, applying the pressurized fluid to an interior volume contained by the duct, and opening the valve to permit an efflux of the pressurized fluid that propels the cable through at least a portion of the length of the duct.

In accordance with another aspect consistent with the principles of the present invention, an apparatus for facilitating the placement of a cable inside of a duct comprises a valve configured to be coupled to an end of the duct and to control flow of a pressurized fluid outward from the inside of the duct. The valve is designed to automatically open and close in response to sensing pressure inside of the duct. Alternatively, the valve may be actuated by a timer or upon command from an external element.

In accordance with yet another aspect consistent with the principles of the present invention, a system for installing cable in a duct comprises a valve coupled to a first end of the duct, and a pressurized fluid source coupled to the second end of the duct, wherein the valve may be actuated to affect pressure inside of the duct.

BRIEF DESCRIPTION OF THE DRAWINGS

The accompanying drawings, which are incorporated in and constitute a part of this specification, illustrate exemplary embodiments of the invention and, together with the description, explain the invention. In the drawings, FIGS. 1A-IC illustrate an exemplary system for installing utility cable within a duct according to one aspect of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with principles of the invention involve inserting a cable into a proximal end of a duct and applying pressurized fluid, such as compressed air, to the duct to carry the cable through the length of the duct. In particular, systems and methods consistent with principles of the invention further involve temporarily closing the distal end of the duct to allow pressure to build within the duct and then opening the duct to trigger an efflux of pressurized fluid which propels the cable through the duct. Use of a valve or the like at the distal end to permit uniform pressurization inside the duct may enable the use of a lower overall pressure over the whole length of the duct as compared to the relatively high pressures used with existing cable blowing techniques. A lower overall pressure may alleviate problems, such as "blow-outs" and duct sealing/clamping failures, which are more common with the relatively high pressures used with existing cable blowing techniques. Alternatively, systems and methods consistent with principles of the invention may operate by applying pulsating pressurization that travels through the duct rather than achieving substantially uniform pressurization along the duct. Actuation of the valve may be performed in time relation to the arrival of pressurization pulses at the valved end of the duct.

Exemplary Cable Installation System

Figure 1A:
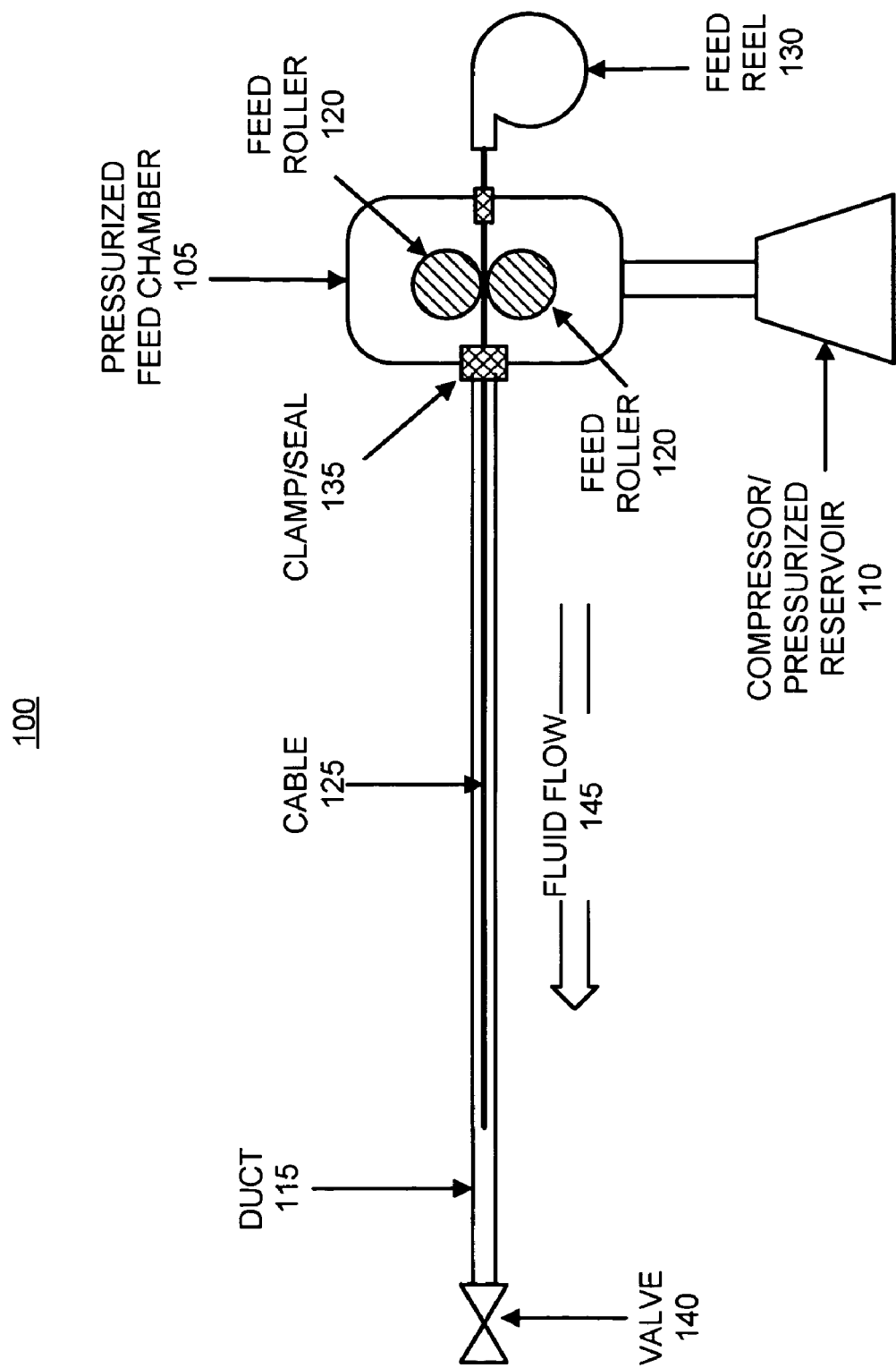

FIG. 1A illustrates a system 100 for installing one or more cables within a duct using pressurized fluid consistent with an aspect of the invention. System 100 may include a pressurized feed chamber 105 and a compressor/pressurized reservoir 110 that provide pressurized fluid to a cable feeding end of a duct 115. The compressor/pressurized reservoir 110 is a pressurized fluid source and may comprise an air pump, blower or a source of compressible gas from a pressurized tank, such as air, carbon dioxide, dry nitrogen, etc. To reduce build-up of static charges, ionized gases may be employed. In some implementations, duct 115 may have a length of approximately several kilometers or even considerably longer. A clamp/seal 135 may produce a fluid tight seal between feed chamber 105 and duct 115. Feed chamber 105 may include feed rollers 120 that may assist in feeding cable 125 from feed reel 130 into the cable feeding end of duct 115. Feed rollers 120 contact the cable and exert a longitudinal force to coerce the cable into the duct (or out of the duct, if necessary.) Feed rollers 120 will typically be motor-driven and may include motor control or transmission elements to control feed rate. Feed rollers 120 may also be involved in monitoring or metering the cumulative length of cable that has been fed into the duct. This can be used to gage progress of the installation and to identify the location of bends or obstructions that may be encountered during installation. Feed tractors, gripping mechanisms or other devices may be used instead of feed rollers to apply force to the cable.

A valve 140 may be coupled to a 'far end' of duct 115, that is, the end of the duct opposite from the feeding end. For the present description, insertion of cable, such as fiber optic cable, into a duct will take place in the direction of 'feeding end' to 'far end' or from 'inlet end' to 'outlet end.' Valve 140 may be closed and pressurized fluid may be applied via compressor/pressurized reservoir 110. (Pressurized fluid may also be constantly applied to the duct inlet, allowing the action of valve 140 to control whether the duct is pressurizing or depressurizing at any given time.) After closing valve 140, the fluid inside duct 115 may come to a uniform, elevated pressure. With the valve closed, a compressible gas may become compressed within the inside of the duct or the interior volume contained by the duct. After the pressure has built up, valve 140 may be opened, causing an efflux of the pressurized fluid contained within the length of duct 115. This efflux may be most significant at the far end of duct 115, but the sudden depressurization may result in a considerable, pressure-driven flow 145 throughout the length of duct 115 that may propel cable 125 through at least a portion of duct 115 (i.e., through a distance known as the blowing distance). Uniform pressurization may enable the use of a lower overall pressure over the entire length of duct 115 as compared to the high pressures currently required at the cable feeding end of duct 115 using existing cable blowing techniques. Uniform pressurization may alleviate the problems of duct "blow-outs" or sealing failures that occur with existing cable blowing techniques.

Figure 1B:
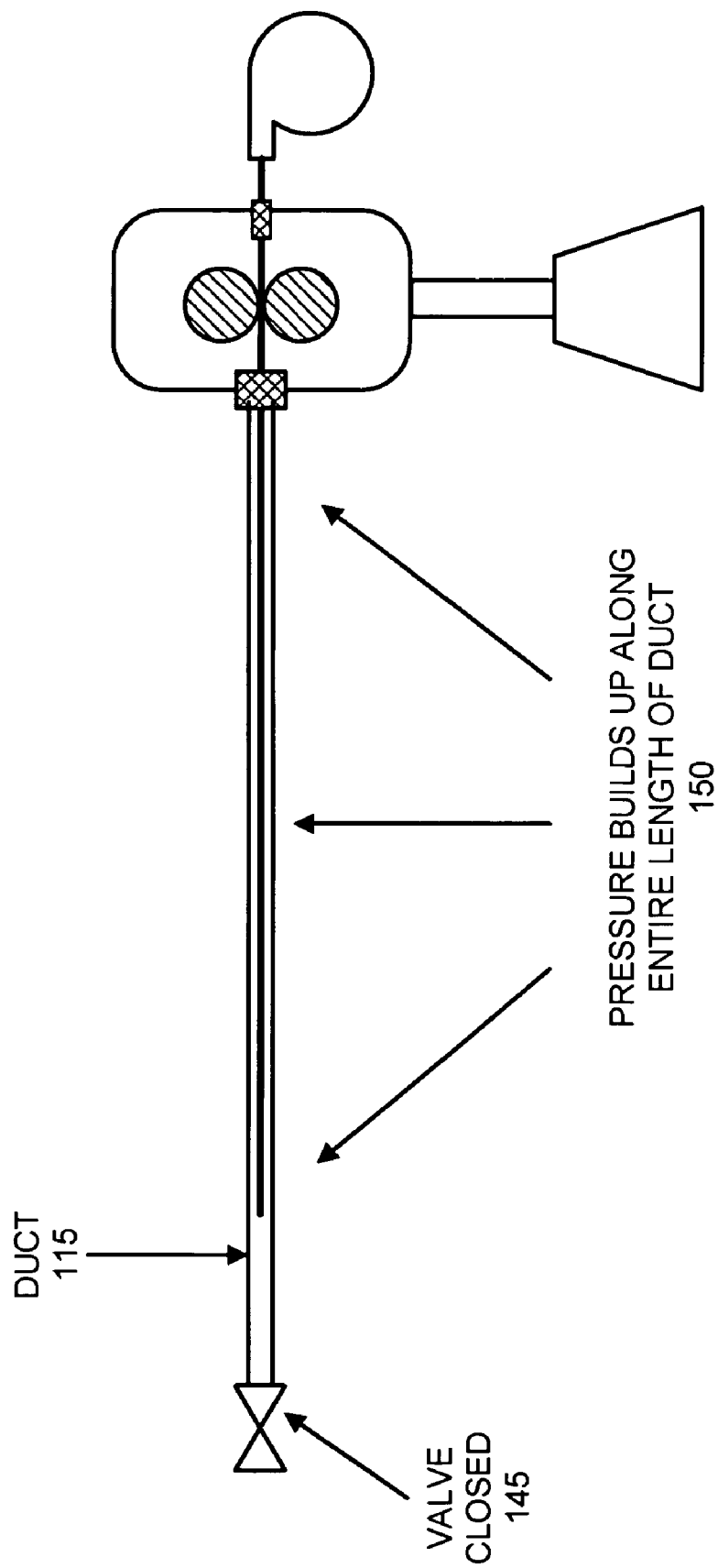

As shown in FIG. 1B, after valve 140 is closed (as indicated at 145), the pressure may build up (as indicated at 150) along the entire length of duct 115 within the interior volume of the duct. Pressurization of duct 115 causes potential energy to be stored over the entire length of duct 115, principally in terms of compression of the fluid and possibly, to a much lesser degree, in terms of minute expansion of the walls of duct 115.

Figure 1C:
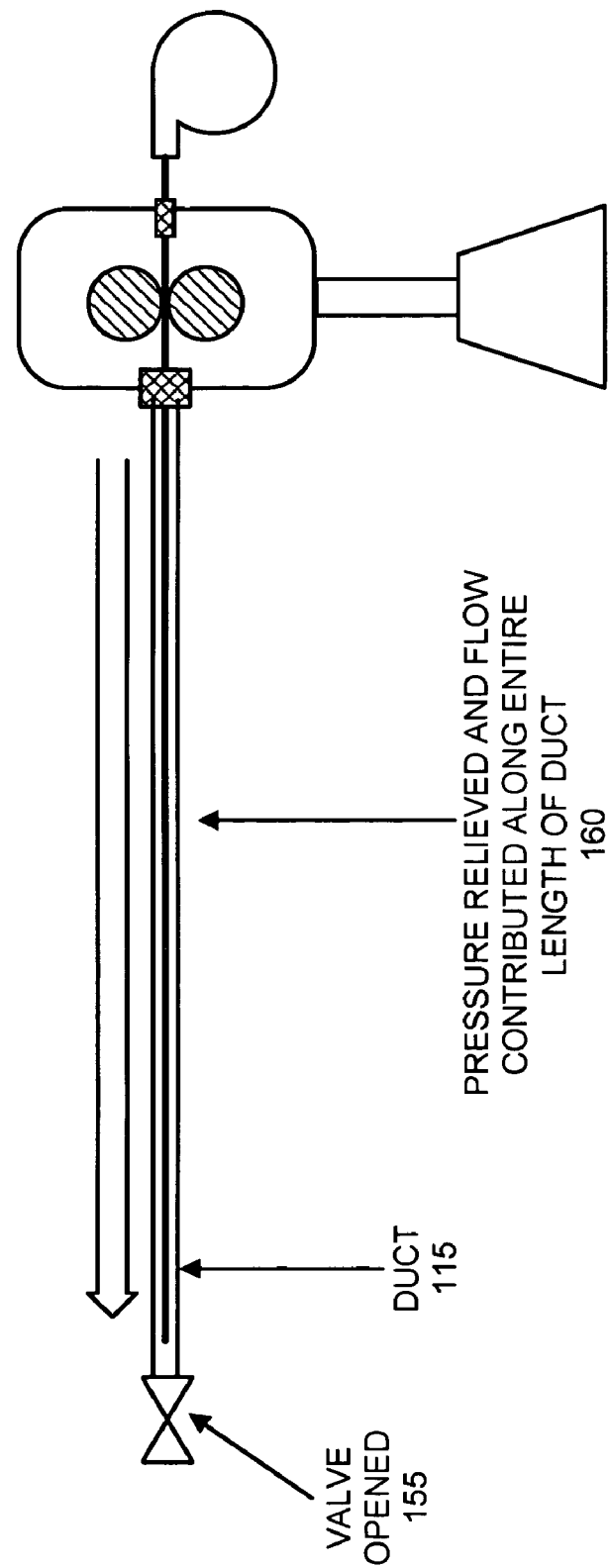

As further shown in FIG. 1C, after application of the pressurized fluid, valve 140 may be opened (see 155). The pressure may then be relieved 160 and flow contributed along the entire length of duct 115 to propel cable 125 through at least a portion of duct 115. By having the potential energy stored as pressurization (gas compression) along the entire length of duct 115, significant flow may be induced near the far end of the duct by sudden depressurization of the interior of the duct in the vicinity of the far end. This flow is not impeded by having to traverse the entire length of the duct, in contrast to the pressurized fluid that is applied at the feeding end of the duct. This effect substantially improves the effectiveness of the blown installation technique in long installations.

In some implementations, the sudden decompression cycle shown in FIGS. 1B and 1C may be repeatedly applied as necessary to draw cable 125 through a substantial portion, or the entire length, of duct 115. A series of pulses or momentary increases in flow of the pressurized fluid through the duct is desirable and may be more effective than a steady flow driven from the feeding end alone. Valve 140 may be designed to automatically open when a preset pressure is detected within duct 115, or when a sufficient differential pressure is detected between the inside of duct 115 and atmospheric or ambient pressure. Valve 140 may be designed to again close when the pressure inside duct 115 falls below a set value. Valve 140 may further be designed to automatically cycle between an open and closed state either on a timed basis, in response to pressure levels inside duct 115 or to a combination thereof. If, for example, the valve 140 is set to automatically open at a first pressure and to automatically close at a second pressure lower than the first pressure, then an automatic cycling behavior may be achieved. Under this condition, even applying a steady pressure and the inlet to the duct will result in cyclic behavior at the outlet of the duct, although the rate at which fluid is forced into the inlet of the duct may be used to modulate the cycle time. This automatic mode of operation enables the valve to be used without further manual intervention once it has been coupled to the duct, facilitating installation by fewer field personnel.

Figure 2:
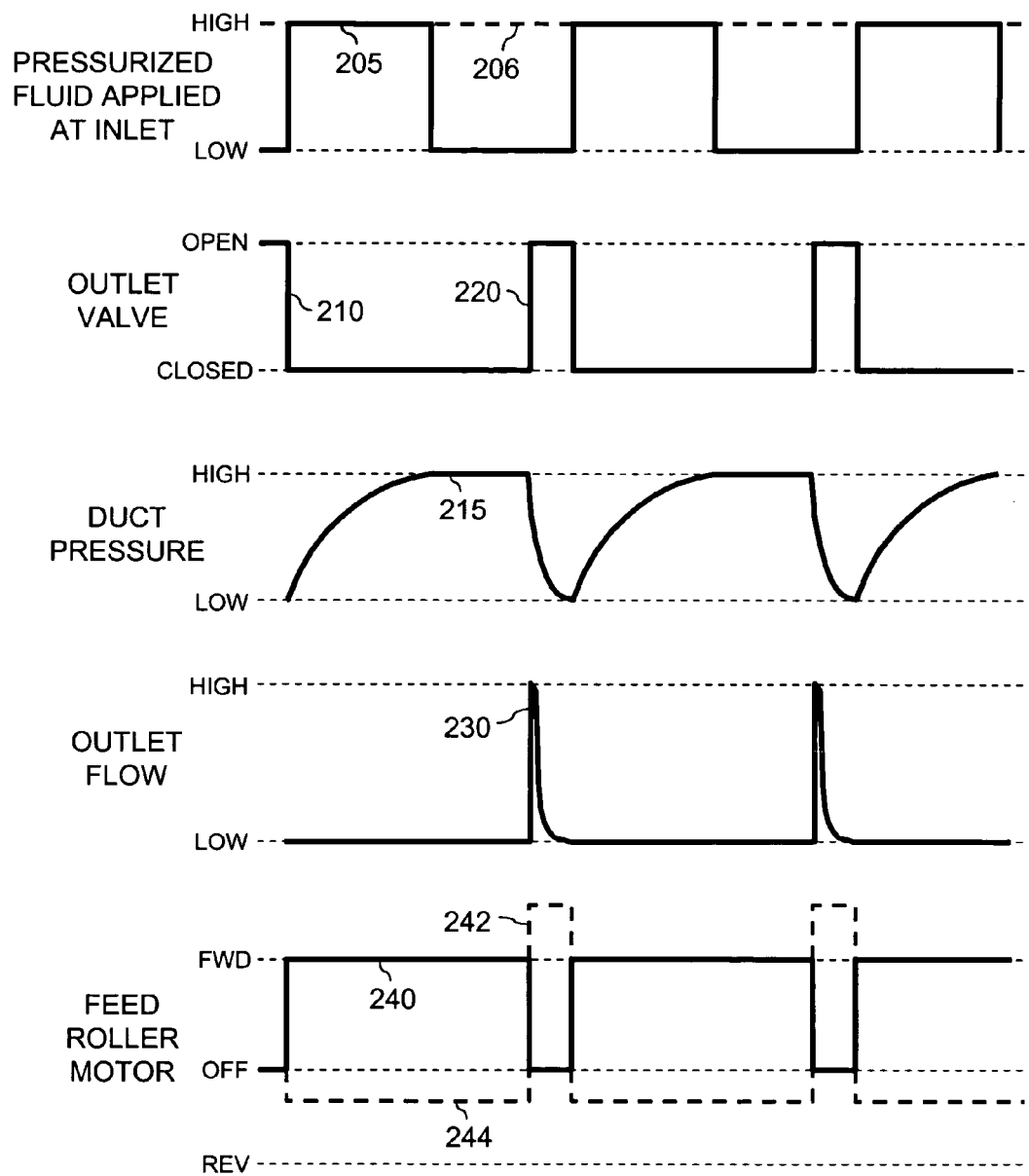
FIGS. 2 and 3 illustrate exemplary timing diagrams associated with the operation of different aspects of the system of FIGS. 1A-IC.

FIG. 2 depicts the relative timing of various aspects of the operation of a installation system and method in accordance with an exemplary embodiment of the present teachings. In FIG. 2, the ordinate represents time. From top to bottom, the first graph represents the application of pressurized fluid at the inlet or feeding end of the duct, the second graph represents the open or closed state of valve 140 at the far end of the duct, the third graph represents the pressure inside the duct, the fourth graph illustrates the rate at which pressurized fluid is passing through the far end of the duct and the fifth graph depicts the optional control of feed rollers in coordination with other events. As shown in FIG. 2, a series of "pulses" 205 of pressurized fluid may be applied in a cyclic fashion to the cable feeding end of duct 115. At a rising edge of each pulse 205, valve 140 may be closed 210 to permit the pressure throughout the length of duct 115 to rise to a uniform level 215. After the pressure through the length of duct 115 has reached a uniform level, valve 140 may be opened 220 (preferably opened abruptly) to produce an efflux of fluid out through duct 115 that propels cable 125 through a portion of duct 115. This technique may be used, in particular, for cables that are either stuck in duct 115 (e.g., because of obstructions along the duct) or to increase the "blowing distance" at a friction point within duct 115. A sudden increase in outlet flow 230 occurs at each cycle after the build-up of pressure and the subsequent release by opening of valve 140. Note that, as depicted by the dashed line 206, an alternative approach may be chosen wherein pressurized fluid is constantly applied to the inlet while the far end valve 140 is cyclically opened 220 and closed 210. The duct pressure and outlet flow will still exhibit the pressurization and release approximately as shown. The fifth graph in FIG. 2 shows the optional control of a feed roller action via a feed roller motor. In time with the pressurization and valve opening, the feed rollers may be controlled to run during the whole time or part of the time when pressure is being accumulated and/or run during the whole time or part of the time when pressure is being released. FIG. 2 shows operating of the feed rollers in a forward direction 240 (forcing the cable into the duct) during the entirety of pressurization, but it is contemplated that rollers may alternatively be controlled to apply a forward pushing force around the same time that valve 140 is opened and outlet flow is maximized. Optionally, forward feed rate may be increased 242 during this time. In some implementations, operating the feed rollers a slight reverse direction (see 244)

for a part of the cycle may also be useful to overcome obstacles, effectively causing the fiber to automatically "back up and try again." To promote better sensing of feeding success, the feed rollers may become neutral during the cycle, particularly during the pressure release portion, to sense cable feed progress without imparting any longitudinal forces. The feed rollers may then be activated in the forward or reverse directions upon detection of successful or unsuccessful flow-driven cable progress.

Figure 3:
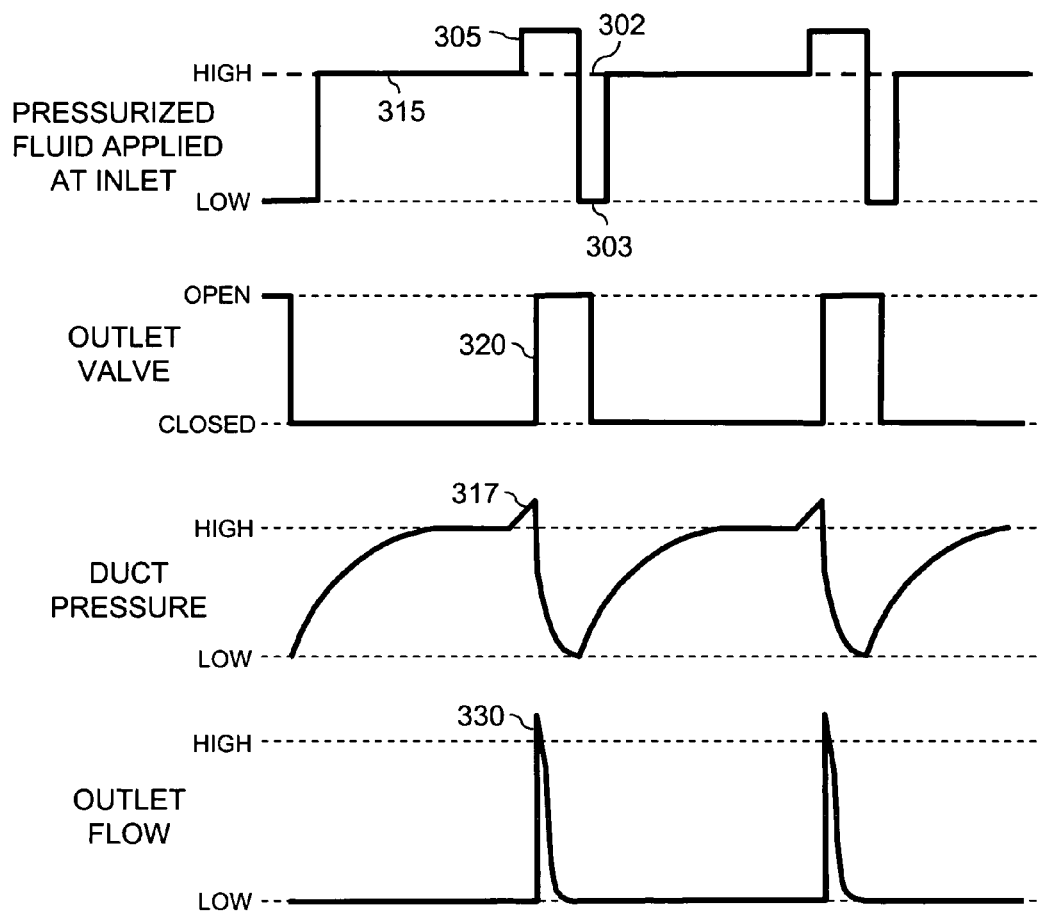

In another implementation, as shown in FIG. 3, a sudden burst 305 of pressurized fluid may also accompany each opening 320 of valve 140. Each burst 305 may enhance the flow rate and viscous carriage of cable 125 through duct 115. Pressure level 315 represents a first level of pressurization, whether expressed as a pressure or a flow rate. Burst 305 represents a second level of pressurization or flow rate at the inlet to the duct, this second level being greater than the first level. A steady flow or pressure level (302) may be sustained at the duct inlet even during valve opening. Alternatively, flow or pressure may be momentarily discontinued (303) while the valve is opened.

The sudden burst 305 may be accomplished by modulating pressure or flow control elements (such as valves or regulators, not shown) interposed between the compressor/pressurized reservoir 110 and the pressurized feed chamber 105 or between the pressurized feed chamber 105 and the duct 115. The control elements may be activated at certain times during the cyclic pressurization and depressurization of the duct 115. The additional burst 305 serves to augment the overall flow along the duct 115 at the same time that pressure stored in the duct is being released. This burst may be timed to begin somewhat before the opening of valve 140 so that the pressure wave caused by the burst has propagated through a substantial proportion of the duct length by the time the valve opens. The timing of the burst relative to the opening of the valve may be adjusted as needed, and may particularly be varied in proportion to a calculated or measured propagation delay between the application of the burst at the inlet of the duct and the appearance of the burst at the outlet.

As the burst travels through the fiber, it may also may rattle the cable or cause a ripple along the cable that jars loose any sections along the cable that experience friction, adhesion, "catches" or "hangs" involving other cables, duct discontinuities or other obstacles. As indicated at 317, the overall duct pressure may escalate slightly in response to application of burst 305, but this effect is not imperative to successful operation employing the burst. If timed properly, the burst may have a significant effect locally even if it does not raise the equilibrium pressure along the entire length of the duct. The effect of the burst may cause increased peak outlet flow 330.

Figure 4:
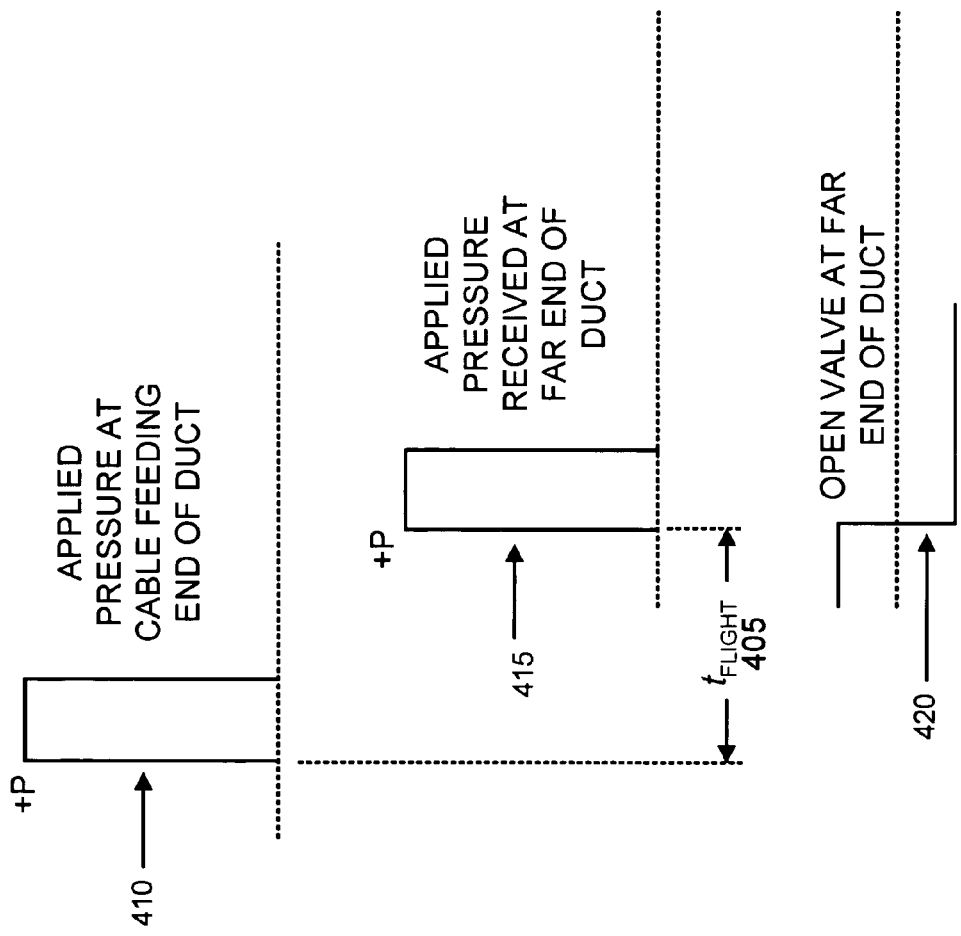
FIG. 4 illustrates an exemplary timing diagram associated with determining a time-of-flight for a pressure wave to travel from one end of a duct to another end.

FIG. 4 illustrates an aspect of the invention in which the opening of the valve may be synchronized with the arrival of the wave of pressurization at the far end of duct 115 from the cable feeding end of duct 115. A user may calculate the propagation time or time-of-flight ($t_{FLIGHT}$) 405 for the pressure 410 applied at the cable feeding end of duct 115 to travel, and be received 415, at the far end of duct 115. Valve 140 may then be opened at an optimum time 420, based on the calculated time of flight, to maximize air flow at the far end of duct 115. One technique to calculate the time-of-flight is to measure the length of duct 115 (e.g., in feet) and divide the measured length by 1100 feet/second (or whatever propagation speed is appropriate for a longitudinal wave through the gas inside the duct and taking into consideration the pressure, density, temperature, gradients and other factors affecting propagation speed.) A technique for empirically measuring the time-of-flight may include creating a loud noise (or a sound wave or a longitudinal compression wave) at the cable feeding end of duct 115, measuring the time-of-flight with an sound receiver at the far end of duct 115, and using a timing device, such as a stopwatch, to determine the time-of-flight. (Of course, this may be measured in either direction, but a correction factor may have to be applied if the net flow of gas through the duct affects the propagation speed.) A very similar technique may be performed by applying an abrupt pressure change to one end of the duct and measuring the time before a corresponding pressure change is observed at the opposite end of the duct.

After determining the time-of-flight, the user may open valve 140 at the optimum time, after application of pressurized fluid to the cable feeding end of duct 115, such that cable 125 experiences the pressure as it reaches the far end of duct 115 so that cable 125 is propelled a maximum distance through duct 115 and more effectively through the most distal portions of the duct. Both the sensing of time-of-flight and controlling of the valve 140 responsive to the determined time-of-flight may be performed automatically by a controller.

Consistent with another aspect of the invention, valve 140 may be partially opened, or a pressure regulator may be coupled to duct 115 in place of valve 140, to maintain a desired continuous flow rate while a net pressure throughout the length of duct 115 is elevated above atmospheric pressure along the entire length of duct 115. Maintaining a minimum pressure or flow rate inside the duct at all times, consistent with this aspect, may achieve desirable flow-versus-drag characteristics.

Figure 5:
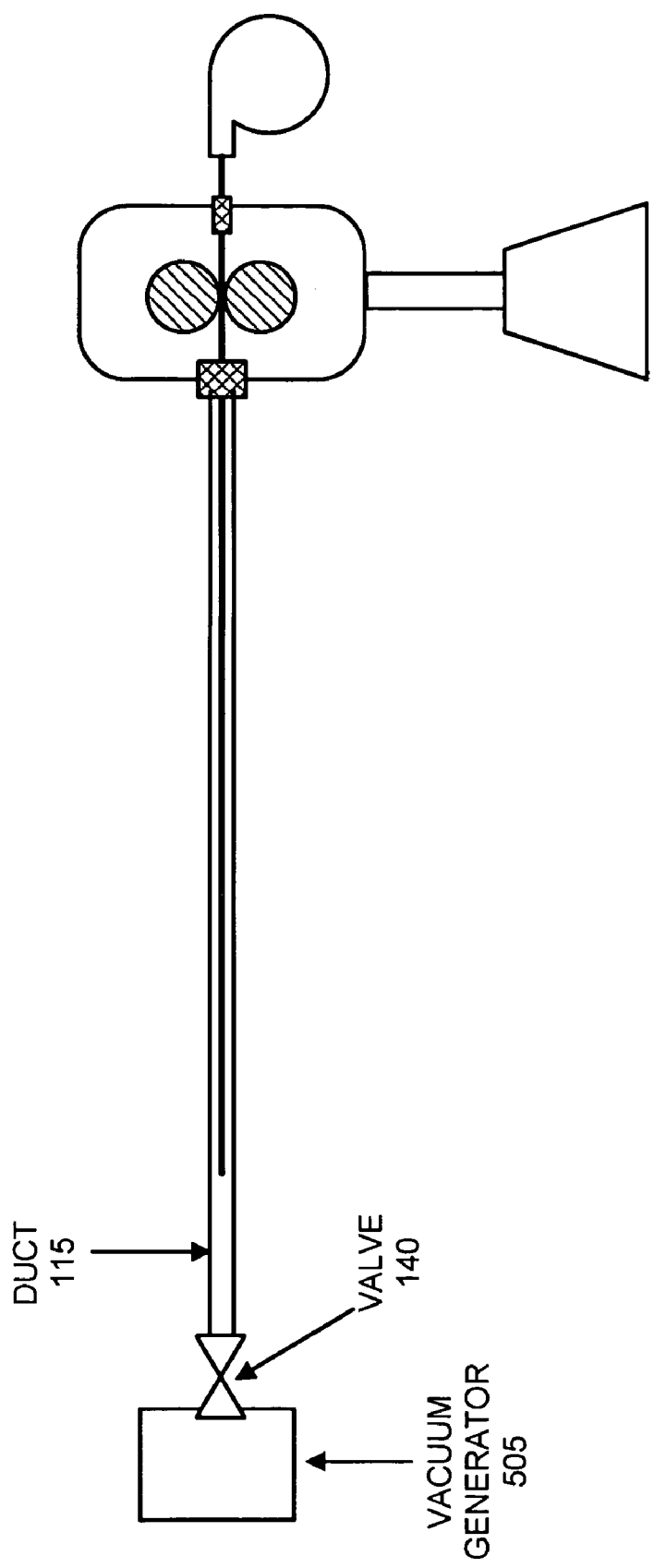
FIG. 5 illustrates an aspect of the invention that uses a vacuum generator at one end of a duct.

FIG. 5 illustrates another aspect of the invention in which a vacuum may be applied at a far end of duct 115 (i.e., the end of duct 115 farthest from the cable feeding end of duct 115), in conjunction with the application of pressurized fluid at the near end of duct 115 (i.e., the cable feeding end of duct 115). In accordance with this aspect, a vacuum-producing element, such as vacuum generator 505, may be coupled to duct 115. Vacuum may be applied to the far end of duct 115 by opening valve 140 at appropriate times. The vacuum-producing element may apply a vacuum to the outlet into the duct either inherently by the opening of valve 140, or may be coupled through a separate valve (not shown) such that the duct may be selectively opened to atmospheric pressure or subjected to vacuum.

Figure 6:
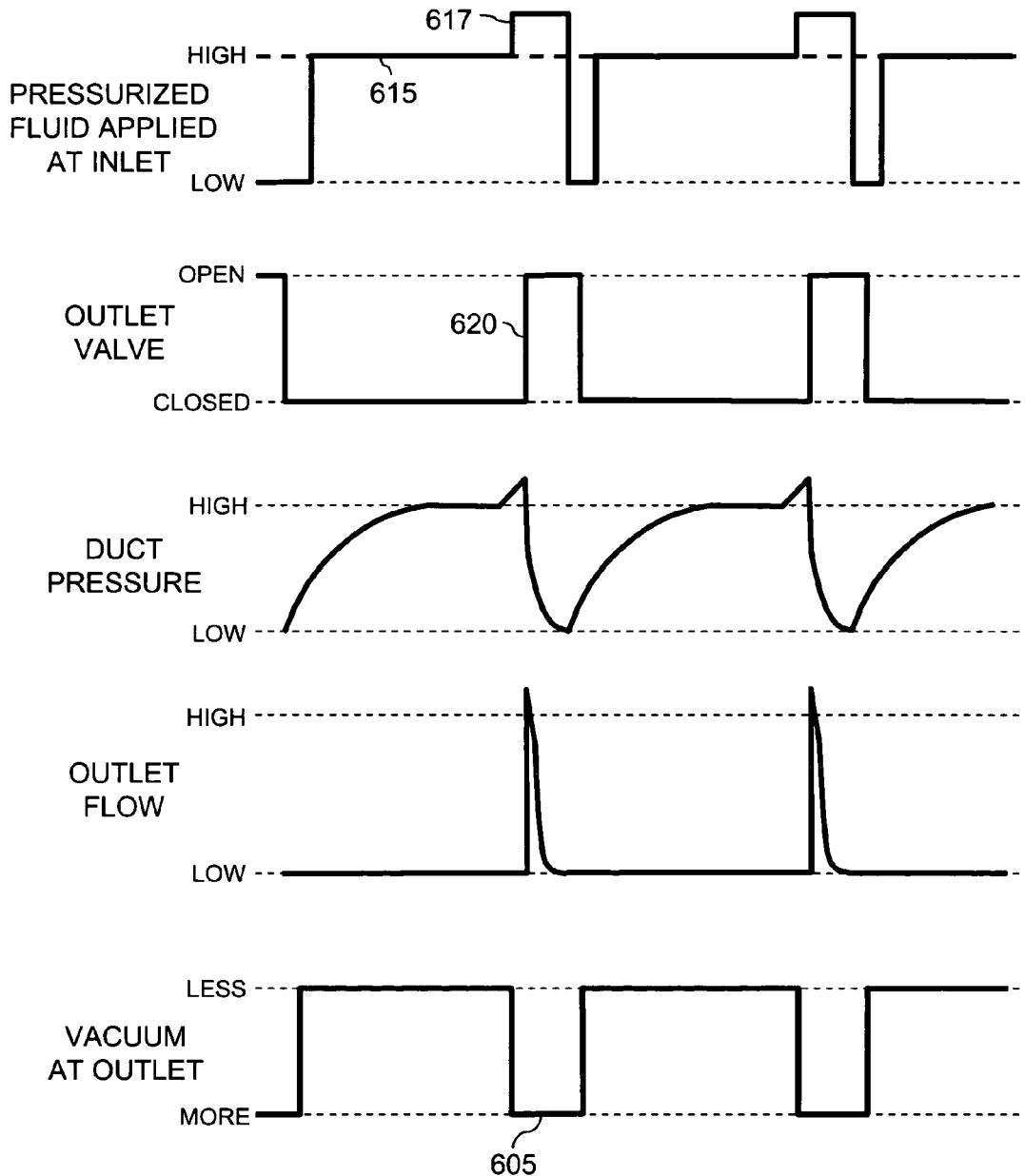
FIG. 6 illustrates an exemplary timing diagram associated with the operation of the system depicted in FIG. 5.

FIG. 6 illustrates a timing diagram of one exemplary implementation in which vacuum may be applied (indicated as 605) when valve 140 is opened (indicated as 620). Application of the vacuum, in conjunction with application of the pressurized fluid 615, may assist in propelling cable 125 a maximum distance through duct 115. An additional timed burst of pressurization (617) may be also used to augment flow as described earlier. Using techniques that are well known to those of ordinary skill in the art, valve 140 may be designed to automatically adjust flow rate in response to sensing any combination of pressures, or pressure differentials, involving pressure inside of duct 1115, vacuum applied to the far end of duct 115, or ambient or atmospheric pressure. The degree of vacuum applied may be integral to the function of valve 140 or may be accomplished by a separate valve (not shown) which couples the vacuum generator 505 to the outlet of valve 140. A detector may also be included at or near valve 140 to detect when the cable being installed has reached the far end of the duct. This detection may be used to signal to the feeding end that the installation is complete. Completion may also be indicated by monitoring the length of cable that has passed through the feed rollers. An automated version of the system may stop further feeding/blowing procedures upon detection of the completed installation.

Figure 7:
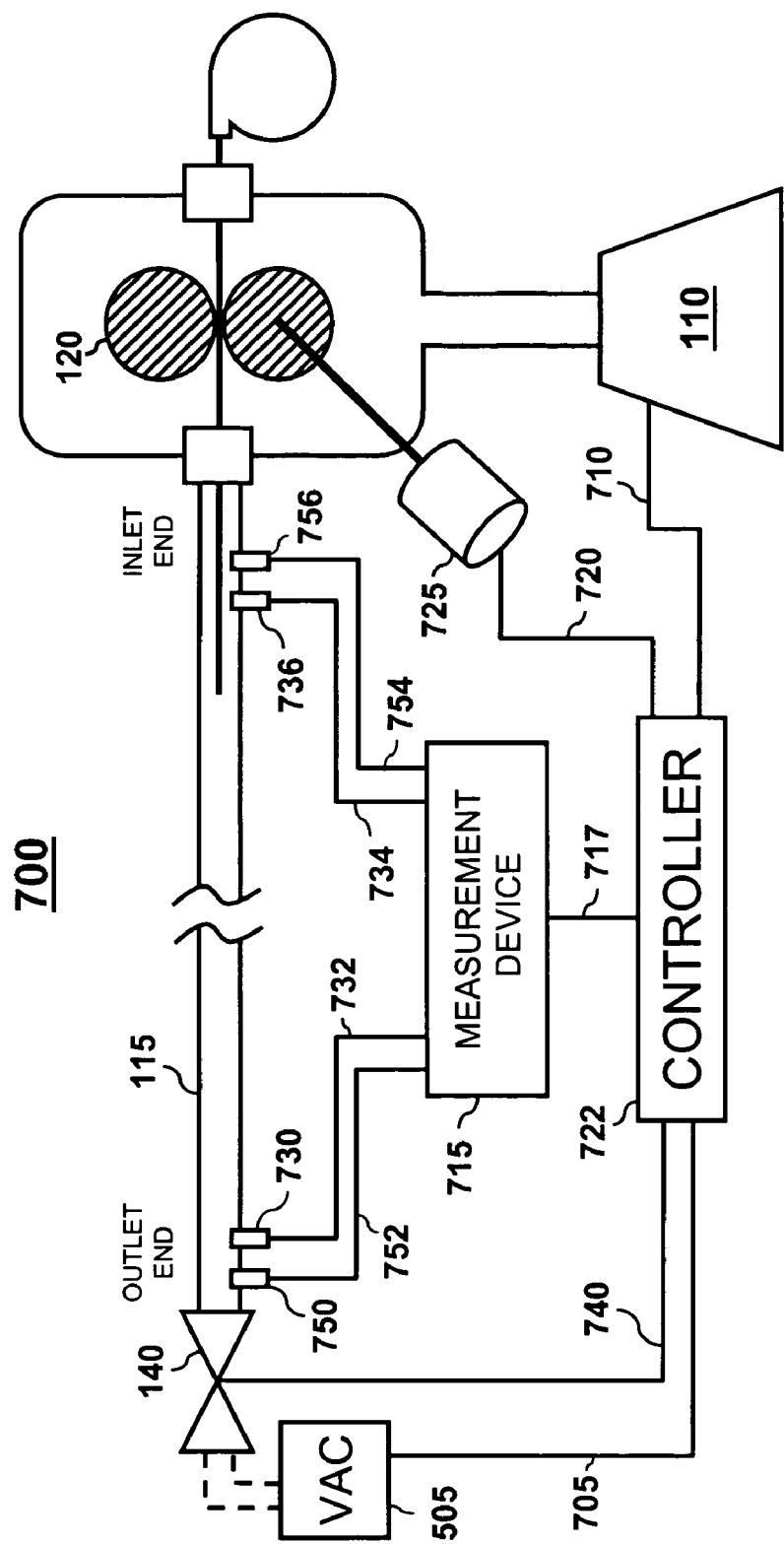
FIG. 7 illustrates another aspect of the invention that uses an automatic control system for opening and closing the valve coupled to one end of a duct.

FIG. 7 depicts an installation system 700 including a control system suitable for supporting various implementations of the present invention. FIG. 7 also illustrates an automatic measurement system which may be optionally used for determining the time-of-flight described above with respect to FIG. 4.

A controller 722 as shown in FIG. 7 may coordinate the action of other elements to achieve operation, for example, as described in FIGS. 2, 3 and 6. As those of ordinary skill will recognize, controller 722 may not be necessary for all useful embodiments as some elements may function autonomously, may interact directly with one another or may encompass some self-contained control functionality. The controller 722 may control or coordinate any combination of: the actuation of valve 140 (via connection 740), the pressure or flow rate applied to the duct by compressor/pressurized reservoir 110 (via connection 710), the force applied to the cable by feed rollers 120 (via connection 720 for controlling motor 725), and the application of vacuum at the outlet end of the duct (vacuum generator 505 controlled over connection 705).

Connection 740 may be used as a control link by which controller 722, or other external element, may control the opening and closing of valve 140. Additionally or alternatively, connection 740 may be used as a signaling link by which valve 140 indicates its opening and closing to controller 722 or, depending on implementation, to other elements external to the valve. In accordance with some embodiments as described, valve 140 may open and close autonomously in response to an interval timer or to a pressure or flow sensor (e.g. sensor 750, described below), any of which may be integral with the valve or directly coupled to the valve. Controller 722 may use the indication of valve actuation to, in turn, control other actions within system 700, such as the pressure or flow issuing from compressor/pressurized reservoir 110 or the application of forces by motor 725 and feed rollers 120. For coordinating and controlling actions throughout system 700, controller 722 may act in response to any or all of the following: efflux flow rate observed at the duct outlet, relative or absolute pressure inside the duct (as detected by a pressure transducer), time as indicated by a timer, indications of actuation of valve 140, detection of movement of the cable with respect to the duct (sensed by a feed rollers 120 or by a separate feed monitoring device (not shown)), or the measured time interval between applying a pressure change at one of the duct and observing a corresponding pressure change at the opposite end of the duct.

Various mechanisms may be employed to empirically measure the propagation delay or so-called 'time-of-flight', relating to the time interval between applying a pressure change at one of the duct and observing a corresponding pressure change at the opposite end of the duct. This measuring may be automated and the resulting measurements made available to controller 722 for coordinating the timing of certain actions, such as the production of a pressure burst 305.

To implement one possible time-of-flight measurement, system 700 may include an acoustic transmitter 736, an acoustic receiver 730 and a time-of-flight measurement device 715. Acoustic transmitter 736 may generate an acoustic signal (a sound wave) at the cable feeding end (inlet end) of duct 115, that may be received at the far end (outlet end) of duct 115 by acoustic receiver 730. Over connection 734, measurement device 715 may either trigger an acoustic signal to be emitted from acoustic transmitter 736 or may be notified when an acoustic signal has been autonomously generated by the acoustic transmitter 736. Via connection 732, measurement device 715 may receive notification when acoustic receiver 730 detects a signal that was sent from acoustic transmitter 736 and has propagated through the interior of duct 115. Measurement device 715 may measure the amount of time (i.e., the time-of-flight) that it takes the generated acoustic signal to travel from the cable feeding end of duct 115 to the far end of duct 115. Measurement device 715 may communicate the measurement to via connection 717 to a controller 722.

In lieu of acoustic signals which may comprise principally audible or ultrasonic frequency components, measurement device 715 may act to introduce an abrupt pressure increase at one end of the duct and to measure the time delay before a corresponding increase in pressure is detected at the other end of the duct. For this operation, measurement device 715 may be coupled to a pressure or flow rate sensor 750 to detect the arrival of the pressure wave near the outlet end of duct 115. Pressure or flow rate sensor 750 represents either a sensor that detects pressure inside the duct at or near the outlet end or a sensor that detects rate of flow of pressurized fluid through the duct at that point. The measured pressure may be absolute or relative to an ambient pressure (or an external vacuum, if used) outside of the duct. The pressure wave to be detected may be created, for example, by controller 722 directing pressurized fluid source 110 to change pressure or flow rate applied to the inlet of the duct. Additionally, another pressure or flow rate sensor 756 may be coupled to the inside of the duct at or near the inlet end of duct 115. Pressure or flow rate sensor 756 may be used to detect changes in pressure that occur at the inlet end of duct 115 and may be useful for performing time-of-flight measurements. Pressure or flow rate sensor 756 may also be used for other control purposes by monitoring the effects of compressor/pressurized reservoir 110 at the inlet to the duct. Pressure/flow rate sensor 756 at or near the outlet of duct 115 may be used to detect the efflux flow rate, which may be useful for determining the completion or effectiveness of a pressurization/release cycle.

Although the measurements just described involve propagating an acoustic signal or pressure wave in a direction from the inlet of the duct to the outlet, those of ordinary skill will recognize that the time-of-flight may also be approximated by, or related in some fashion to, a similar measurement performed in the opposite direction, that is, by propagating a signal from the outlet to the inlet. The present invention is not intended to be limited to performing measurements strictly in the same direction that the cable will be installed into the duct. Furthermore, time-of-flight measurements obtained in either direction may influence the timing of other actions in system 700, but may not necessarily be used directly as the timing values by which events are coordinated. For example, a time-of-flight measurement achieved by propagating an acoustic sound wave may not be identical to the time-of-flight for a sudden pressure increase, yet the former may be mathematically related to the latter allowing for indirect estimation of the latter. Other correction factors or offsets may need to be applied to achieve desired operation. For example, in some implementations it may be desirable to have a pressure wave just reach the last 20% of the length of the duct at the time that the valve is opened. Therefore, the timing between applying the pressure wave the inlet to the duct in the opening of the valve will not be equal to the measured time-of-flight, but instead will intentionally be scaled to approximately 80% of the measured time-of-flight. A fixed offset may also be applied related to, for example, how fast valve can open. As described in conjunction with FIGS. 2, 3 and 6, various aspects of the sequencing and relative timing of the events in the system may be adjusted to achieve desirable operation under different circumstances, all within the spirit and scope of the present invention.

It should be noted that inputs from various sensors such as acoustic transmitter 736, acoustic receiver 730, pressure/flow rate sensors 750,756 may be coupled through measurement device 715 as shown for clarity, or may alternatively or additionally be coupled to controller 722 directly. For example, controller 722 may employ pressure or flow rate indications from pressure/flow rate sensors for purposes other than measuring time of flight. Furthermore, controller 722 may integrate or otherwise fulfill the functions of measurement device 715.

Although not every single possibility for placing pressure and flow sensors is explicitly shown in FIG. 7, it should be understood that relative or absolute pressure sensors may be employed anywhere within system 700 to determine pressures at selected points and differential pressures between selected points, including an ambient pressure, such as the Earth's atmospheric pressure, generally outside of and surrounding duct 115 or system 700. One of ordinary skill in the art, in view of the desired operation and principles taught herein, may readily determine suitable placement of sensors of various types to successfully implement the present teachings.

Measurement device 715 and its associated elements are optional and controller 722 may control the pressurization and depressurization of duct 115 with or without being responsive to time-of-flight measurements. If control of system 700 is responsive to time-of-flight measurements, controller 722 may initiate or control, via connection 710, the application of pressurized fluid, such as compressed gas, from compressor/pressurized reservoir 110 and then initiate the opening of valve 140, via control line 740, after a time interval that is based on the measured time-of-flight. System 700 may adaptively automatically control the installation of a cable through duct 115 based on continuous or periodic measurements that can be used to adjust timing of actions and other parameters of operation.

Controller 722 and measurement device 715, if used, may be located anywhere. Any of the various connections depicted in FIG. 7 may be implemented using, for example, electrical signals through wires, optical signals through optical fibers, radio signals, etc. The connections may be implemented through electrical or optical cables that have been installed through duct 115 or which otherwise parallel the path of the duct. Elements of the system may also communicate with one another over a wireline or wireless telephone connection through a public or private telephone network, an 'order wire' connection, or facilities of railroads or public utilities, such as telephone lines, electric power lines and cable television plants.

Exemplary Cable Installation Process

Figure 8:
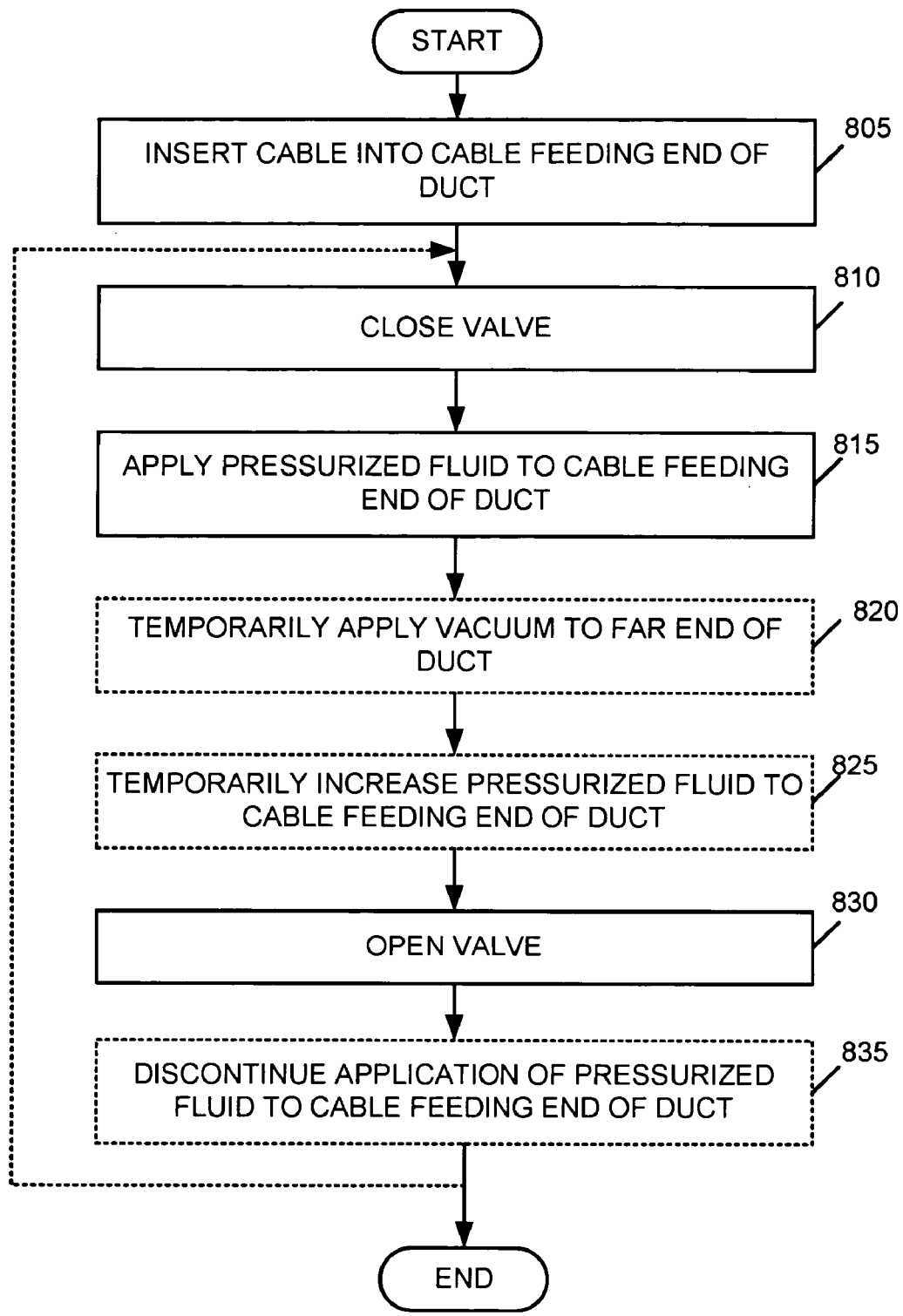
FIG. 8 is a flow chart that illustrates an exemplary cable installation process consistent with an aspect of the invention.

FIG. 8 is a flowchart that illustrates an exemplary process, consistent with an aspect of the invention, for installing a utility cable within a duct. The cable is typically round and of uniform cross-section throughout its length. However, to facilitate blown installation, the cable may alternatively provide a thickened section at one end or may be temporarily be fitted at the distal end with a drogue, piston or plug of some form. These measures may be particularly useful in the context of the present invention due to the enhanced flow rates expected towards the far end of the duct. The exemplary process may begin with the insertion of the cable 125 into a cable feeding end of duct 115 (act 805). Valve 140 may then be closed (act 810). Valve 140 may be closed manually, or via control by device 715. Pressurized fluid may be applied, via compressor/pressurized reservoir 110, to the cable feeding end of duct 115 (act 815). Pressurized fluid may be applied via manual control, or via control by device 715. Optionally, vacuum may be temporarily applied to the far end of duct 115 (act 820). The vacuum may be applied over a time period just prior to opening valve 140 to a period after valve 140 is opened. Optionally, a level of the applied pressurized fluid may be increased (act 825). The level of the applied pressurized fluid may be increased over a time period just prior to the opening of valve 140 to a period after valve 140 is opened.

Valve 140 may be opened (act 830). Valve 140 may be opened manually, or via control by device 715. Opening of valve 140 may produce an efflux of fluid out through the far end of duct 115, thus, propelling cable 125 a distance through duct 115. Application of the pressurized fluid to the cable feeding end of duct 115 may then, optionally, be discontinued (act 835). As shown in FIG. 2, application of the pressurized fluid may be discontinued to produce a "pulse" of pressure. Acts 810-835 may be successively repeated to draw cable 125 through the entirety of, or a substantial portion of, duct 115.

CONCLUSION

The foregoing description of embodiments of the invention provides illustration and description, but is not intended to be exhaustive or to limit the invention to the precise form disclosed. Modifications and variations are possible in light of the above teachings or may be acquired from practice of the invention. While a series of acts has been described with respect to FIG. 8, the order of the acts may vary in other implementations consistent with the invention. Also, acts which are not interdependent may be performed in parallel. For simplicity, some possible acts, such as the application of forces by feed rollers or the performance of time-of-flight measurements, are not shown in FIG. 8 and are adequately described elsewhere.

No element, act, or instruction used in the foregoing description should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the following claims and their equivalents.

What is claimed is:

1. An apparatus comprising:
a valve coupled to a first end of a duct, where the duct is configured to receive a cable at a second end of the duct, the second end being different than the first end of the duct, and where the valve controls a flow of a pressurized fluid outward from inside the duct to facilitate movement of the cable through the duct toward the first end;
a controller to actuate the valve via a control interface; and
a pressurized fluid source, coupled to the second end of the duct, to introduce the pressurized fluid into the second end of the duct,
where the controller opens the valve to allow the flow of the pressurized fluid outward from inside the duct to reduce a pressure of the pressurized fluid in the duct, and where the controller opens the valve at a time based on a propagation delay of a pressure pulse traveling from the pressurized fluid source to the valve.

2. The apparatus of claim 1 further comprising a signaling interface through which an indication of a state of the valve may be indicated.

3. The apparatus of claim 1 further comprising:
a sensor for measuring the pressure or a flow rate of the pressurized fluid inside of the duct.

4. The apparatus of claim 3, where the controller is further configured to actuate the valve based on the measured pressure.

5. The apparatus of claim 1, where the controller is further configured to control actuation of the valve on a periodic basis or after the pressure pulse of the pressurized fluid.

6. The apparatus of claim 1 further comprising:
a vacuum coupled to the first end of the duct to draw the pressurized fluid from the duct when the valve is opened.

7. The apparatus of claim 1 further comprising:
a vacuum coupling for coupling a vacuum to the first end of the duct.

8. The apparatus system of claim 1, where the valve closes to disallow the flow of the pressurized fluid out from the inside of the duct to increase the pressure of the pressurized fluid in the duct.

9. The apparatus system of claim 1, where the first end of the duct is a distal end and the second end of the duct is a proximate end opposite the distal end.

10. A system comprising:
a valve coupled to a distal end of a duct; and
a pressurized fluid source coupled to a proximate end of the duct, the proximate end being opposite the distal end of the duct, the pressurized fluid source introducing fluid into the duct, where actuation of the valve affects pressure inside of the duct to facilitate movement of a cable through the duct toward the distal end; and
a timer that determines a time interval between a change in pressure at the proximate end of the duct and a corresponding change in pressure at the distal end of the duct, where a timing of the actuation of the valve is based on the time interval.

11. The system of claim 10 further comprising:
a feeding mechanism that applies force to move the cable inside of the duct.

12. The system of claim 10 further comprising:
a feed detector that detects movement of the cable with respect to the duct.

13. The system of claim 10 further comprising:
a sensor that measures a pressure or a flow of the fluid inside of the duct.

14. The system of claim 10 further comprising:
an inlet controller for affecting at least one of: pressure applied at the proximate end of the duct by the pressurized fluid source, or a rate of flow of the fluid into the duct from the pressurized fluid source.

15. The system of claim 10 further comprising:
a vacuum coupled to the distal end of the duct for drawing fluid from the distal end of the duct.

16. The system of claim 10 further comprising:
a controller that controls at least one of: applying force to move the cable with respect to the duct, actuation of the valve, pressure applied to the proximate end of the duct by the pressurized fluid source, flow rate of fluid into the proximate end of the duct from the pressurized fluid source, or activation of a vacuum coupled to the distal end of the duct.

17. The system of claim 16 where the controller performs control in response to at least one of: pressure inside the duct, time as indicated by the timer, indications of actuation of the valve, detection of movement of the cable with respect to the duct, a cable feed rate, or the time interval.

* * * * *